(12) United States Patent
Zaidi et al.

(10) Patent No.: US 6,687,014 B2
(45) Date of Patent: Feb. 3, 2004

(54) METHOD FOR MONITORING THE RATE OF ETCHING OF A SEMICONDUCTOR

(75) Inventors: Shoaib Hasan Zaidi, Poughkeepsie, NY (US); Gangadhara S. Mathad, Poughkeepsie, NY (US)

(73) Assignee: Infineon Technologies AG (DE)

( * ) Notice: Subject to any disclaimer, the term of this patent is extended or adjusted under 35 U.S.C. 154(b) by 60 days.

(21) Appl. No.: 10/050,737

(22) Filed: Jan. 16, 2002

(65) Prior Publication Data
US 2003/0133127 A1 Jul. 17, 2003

(51) Int. Cl.[7] ................................................. G01B 9/02
(52) U.S. Cl. ....................................................... 356/504
(58) Field of Search .................................. 356/503, 504

(56) References Cited

U.S. PATENT DOCUMENTS

| | | | |
|---|---|---|---|
| 4,131,365 A | 12/1978 | Pryor | 356/356 |
| 4,615,620 A | 10/1986 | Noguchi et al. | 356/378 |
| 4,704,033 A | 11/1987 | Fay et al. | 356/363 |
| 4,767,495 A * | 8/1988 | Nishioka | 216/60 |
| 4,873,430 A | 10/1989 | Juliana et al. | 250/225 |
| 4,927,485 A | 5/1990 | Cheng et al. | 156/345 |
| 5,225,888 A | 7/1993 | Selwyn et al. | 356/346 |
| 5,337,144 A | 8/1994 | Strul et al. | 356/357 |
| 5,338,390 A | 8/1994 | Barbee et al. | 156/627 |
| 5,395,769 A | 3/1995 | Arienzo et al. | 437/7 |
| 5,445,705 A | 8/1995 | Barbee et al. | 156/627 |
| 5,450,205 A | 9/1995 | Sawin et al. | 356/382 |
| 5,456,788 A | 10/1995 | Barbee et al. | 156/345 |
| 5,480,511 A | 1/1996 | Barbee et al. | 156/627 |
| 5,489,361 A | 2/1996 | Barbee et al. | 156/627 |
| 5,500,073 A | 3/1996 | Barbee et al. | 156/345 |
| 5,516,399 A | 5/1996 | Balconi-Lamica et al. | 156/627 |
| 5,573,623 A | 11/1996 | Barbee et al. | 156/345 |
| 5,573,624 A | 11/1996 | Barbee et al. | 156/345 |
| 5,582,746 A | 12/1996 | Barbee et al. | 216/86 |
| 5,694,207 A | 12/1997 | Hung et al. | 356/72 |
| 5,708,506 A | 1/1998 | Birang | 356/371 |
| 5,788,801 A | 8/1998 | Barbee et al. | 156/345 |
| 5,956,355 A | 9/1999 | Swanson et al. | 372/20 |
| 6,074,516 A | 6/2000 | Howald et al. | 156/345 |
| 6,160,826 A | 12/2000 | Swanson et al. | 372/20 |
| 6,290,572 B1 | 9/2001 | Hofmann | 451/5 |

* cited by examiner

Primary Examiner—Samuel A. Turner
Assistant Examiner—Michael A. Lyons
(74) Attorney, Agent, or Firm—Lerner, David, Littenberg, Krumholz & Mentlik, LLP

(57) ABSTRACT

A method of measuring the rate of etching of trenches on a substrate using interferometry is provided. The method comprises transmitting onto the substrate incident electromagnetic radiation having a wavelength above the wavelength at which the trenches act as waveguides for the radiation; collecting reflected electromagnetic radiation from the substrate; detecting a repetitive pattern of maximum intensities and minimum intensities of the reflected electromagnetic radiation during the etching; and determining the rate of etching based upon the wavelength of the incident electromagnetic radiation and the time period of the pattern.

32 Claims, 4 Drawing Sheets

METHOD FOR MONITORING THE RATE OF ETCHING OF A SEMICONDUCTOR

BACKGROUND OF THE INVENTION

The present invention relates to a system and method for monitoring the rate of etching of a semiconductor wafer. In particular, the present invention relates to a system and method for monitoring the rate of etching of a semiconductor wafer using interferometry.

In the manufacture of semiconductor devices, for example, integrated circuits or flat panel displays, layers of materials are alternately deposited onto, and etched from, a substrate surface. As is well known in the art, the etching of the deposited layers may be accomplished by wet etching, dry etching and other techniques. The dry etching technique includes, for example, plasma chemical etching and plasma reactive ion etching.

In the dry etching technique, the etching of the semiconductor typically takes place inside a plasma processing chamber. The semiconductor's outer layer is coated with an appropriate photoresist mask or hard mask. Plasma gas etches the areas of the outer layer not protected by the mask to form a desired pattern in the outer layer.

To avoid etching too deeply during this process, the rate of etching must be monitored. Interferometry frequently is used for this purpose. In general, when using interferometry, the substrate's outer layer is illuminated using a light source. This light source may be, for example, a laser, a tungsten/halogen lamp or a plasma emission. A photodetector collects light reflected from this outer layer and the trenches being etched within this layer. In a typical plasma processing chamber, both the light source and the photodetector are disposed outside of the chamber to avoid exposing these devices to the corrosive etching environment within the chamber. The plasma processing chamber, therefore, employs a transparent observation window through which the illuminating beams and the reflected beams pass.

The photodetector monitors the reflected light for the repetitive maximum intensity and minimum intensity resulting from, respectively, constructive interference and destructive interference of the reflected light during the etching process. As shown in FIG. 1, the light reflected from the outer layer and the trenches exhibits a maximum intensity or a minimum intensity each time the depth of the trenches changes by an amount $\Delta d$ equal to one half the wavelength $\lambda$ of the incident light. Although not shown in FIG. 1, this repetitive pattern generally attenuates over time with the trenches' increasing depth. The period T of each maximum cycle and minimum cycle of the reflected light, therefore, represents a change in the depth of the trenches proportional to $\lambda/2$. The rate of etching R can be represented, therefore, as follows:

$$R = \Delta d/T = \lambda/2T$$

Using an appropriate logic circuit, the photodetector determines the depth to which the outer surface has been etched based upon the wavelength of the incident light and the time period between maximum intensities or minimum intensities of the reflected light.

In order for the intensity of the light reflected from the bases of the trenches to be adequate to create a detectable interference pattern with the light reflected from the substrate's outer layer, it is well established in the art to select the wavelength of the incident light such that the trenches act as waveguides for transmission of the light incident upon them. As is also well known in the art, a waveguide transmits light or other electromagnetic radiation only if the wavelength of the radiation is below a certain cutoff value (the frequency of the radiation is above a certain cutoff value). The high attenuation losses within the waveguide for electromagnetic radiation having wavelengths above the cutoff value (frequencies below the cutoff value) prevent a standing wave from existing within the waveguide.

The cutoff wavelength $\lambda_c$ for the radiation depends upon the geometry of the waveguide. For a rectangular waveguide, radiation can be transmitted along the waveguide only if the radiation's wavelength is less than twice the long edge b of the waveguide as shown in FIG. 2 ($\lambda_c = 2b$). For a circular waveguide, the cut off wavelength $\lambda_c$ is 1.71 times the diameter of the waveguide ($\lambda_c = 1.71d$).

Manufacturers of semiconductors are continuously striving to fabricate more and more transistors on a single semiconductor wafer. As a result, the size of the trenches etched in the wafers is becoming progressively smaller. The width b of rectangular trenches or the diameter of circular trenches (critical dimension) in many cases is now less than 100 nanometers(nm). Trenches having such a small size substantially complicate the use of interferometry for measuring the rate of etching.

For circular trenches having a diameter of 100 nanometers or less, the wavelength of the incident light must be less than 171 nanometers for the trenches to act as waveguides. The frequency of such electromagnetic radiation is in or about the ultraviolet range. At such small wavelengths (high frequencies), the radiation is quickly absorbed by both the atmosphere and the substrate, notwithstanding that the trenches act as waveguides. As a result, the interferometric equipment used at such small wavelengths must be specially designed including being housed within a vacuum or within an atmosphere purged with nitrogen to overcome absorption of the radiation by the atmosphere. The use and manufacture of such equipment is extremely complicated and expensive. Even using such equipment, the substantial absorption of the electromagnetic radiation by the substrate often results in a poor interferometric signal during etching.

SUMMARY OF THE INVENTION

We have discovered that the use of interferometry to measure the etching rate of small trenches on semiconductor wafers and other substrates is substantially enhanced by using light or other electromagnetic radiation having wavelengths substantially longer than the cutoff wavelength for the trenches, i.e., substantially longer than the wavelengths at which the trenches act as waveguides for the radiation. Although the use of wavelengths above the cutoff wavelength prevent the trenches from acting as waveguides to support transmission of the electromagnetic radiation to the bases of the trenches, the substrate at such wavelengths is far more transparent to the radiation. As a result, for small trenches, substantially more radiation passes into the substrate and actually reaches the bases of the trenches than at wavelengths below the cutoff wavelength. Also, the substrate remains sufficiently reflective at the longer wavelengths for substantial radiation still to be reflected from both the substrate's outer layer and the bases of the trenches. As result, notwithstanding that the trenches do not act as waveguides for transmitting the incident radiation, substantial constructive and destructive interference nevertheless occurs to produce a strong interferometeric signal for monitoring the etching rate.

A method of measuring the rate of etching of trenches on a substrate in accordance with the present invention includes transmitting onto the substrate incident electromagnetic radiation having a wavelength above the wavelength at which the trenches act as waveguides for the radiation; collecting reflected electromagnetic radiation from the substrate; detecting a repetitive pattern of maximum intensities and minimum intensities of the reflected electromagnetic radiation during the etching; and determining the rate of etching based upon the wavelength of the incident electromagnetic radiation and the time period of the pattern.

For a circular or rectangular trench, the wavelength of the incident electromagnetic radiation preferably is, respectively, greater than 1.71 times the diameter of the trench and 2.00 times the length of the long edge of the trench. The critical dimension of the trenches preferably is 200 nm or less, and, for such trenches, the wavelength of the incident electromagnetic radiation preferably is 470 nm or greater.

The substrate preferably is a semiconductor wafer selected from the group consisting of silicon (Si), germanium (Ge) and the compound semiconductors including, but not limited to, gallium arsenide (GaAs), gallium nitride (GaN), indium phosphide (InP) and gallium indium phosphide (GaInP). The substrate preferably is housed within an etching chamber, and the incident electromagnetic radiation and the reflected electromagnetic radiation preferably are transmitted through a window in the etching chamber. The incident electromagnetic radiation preferably is transmitted from a source of radiation selected from the group consisting of a diode laser, a tungsten/halogen lamp and a helium/neon light.

The transmitting of the incident electromagnetic radiation preferably comprises transmitting this radiation through a focusing lens onto the substrate, and the collecting of the reflected radiation preferably comprises collecting this radiation from a collecting lens.

The detecting of the repetitive pattern of maximum intensities and minimum intensities preferably comprises detecting this pattern using a photo detector. The rate of etching preferably is proportional to $\lambda/2T$, where $\lambda$ is the wavelength of the incident light and T is the time period between consecutive maximum intensities of the reflected light or consecutive minimum intensities of the reflected light.

DETAILED DESCRIPTION OF THE PREFERRED EMBODIMENTS

Figure 1:
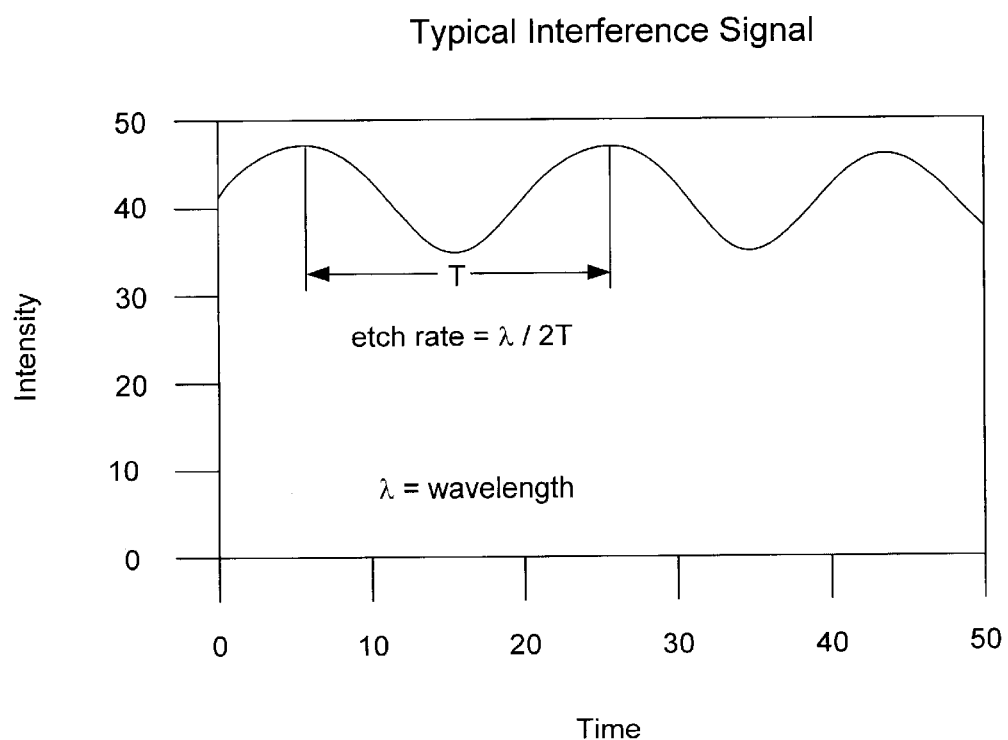
FIG. 1 is a graph illustrating a typical interference signal observed during the etching of a substrate.
Figure 2:
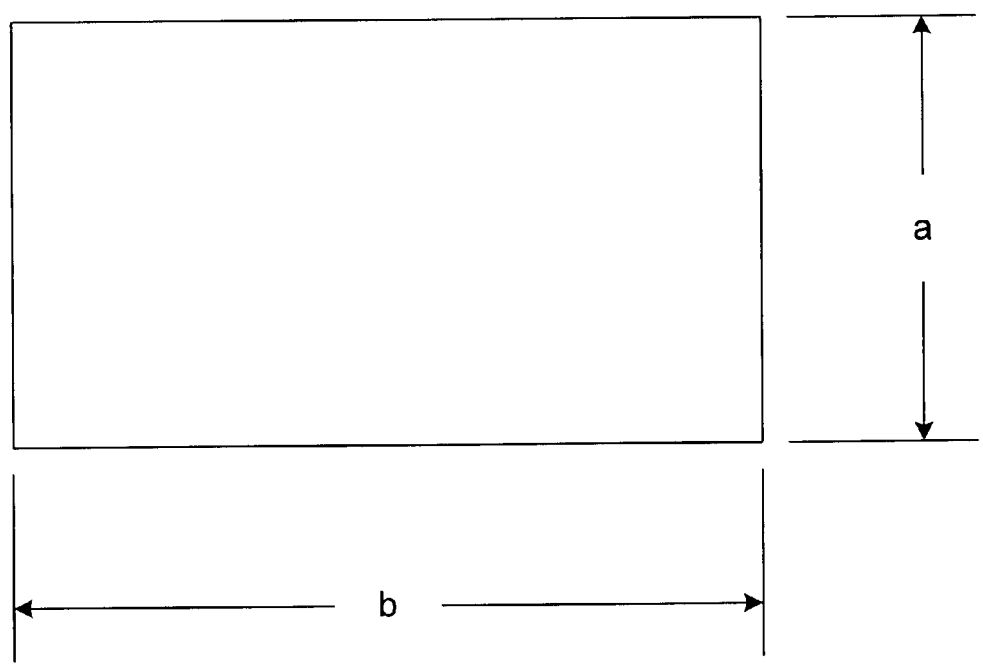
FIG. 2 is an illustration of a rectangular waveguide.
Figure 3:
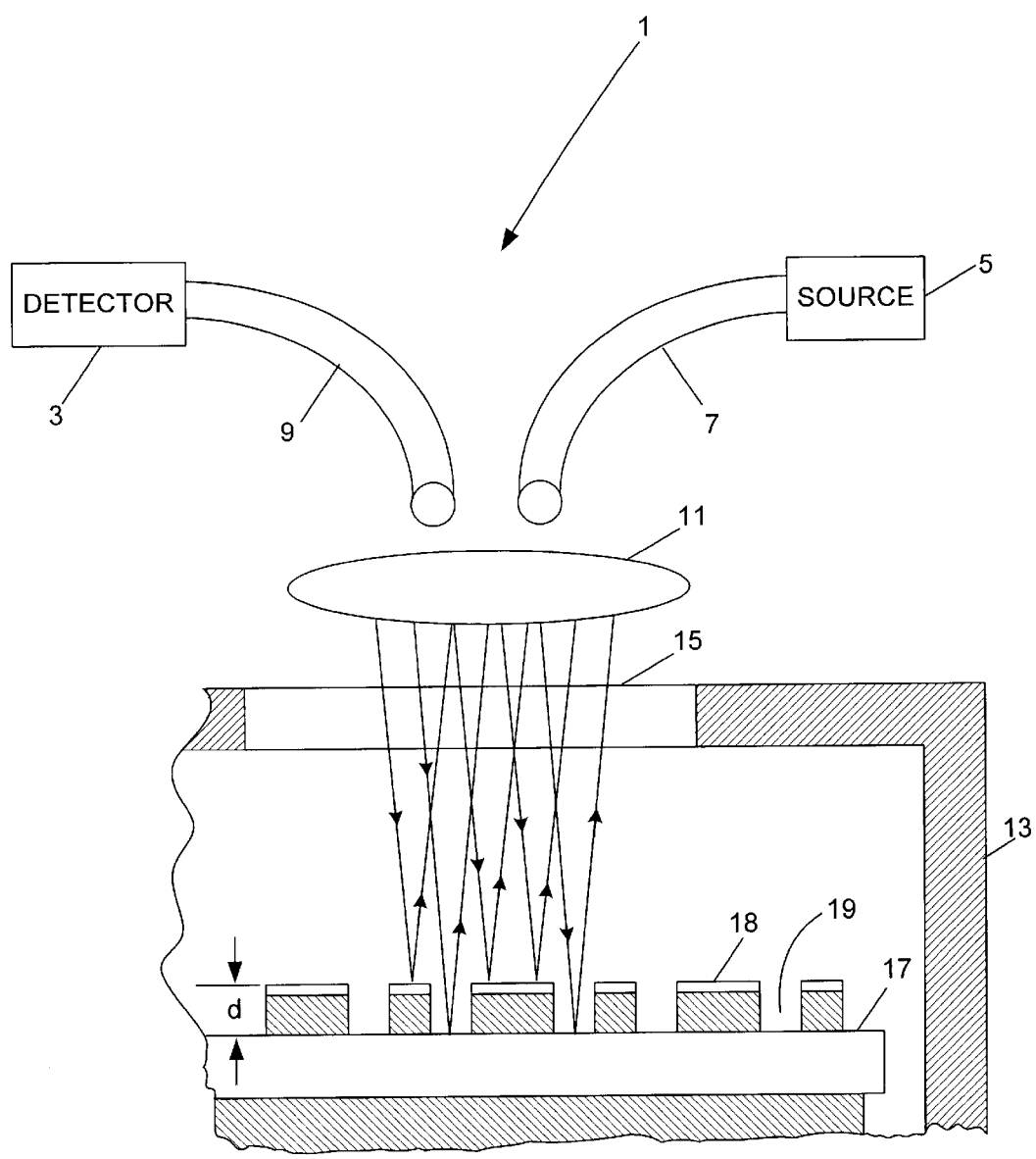
FIG. 3 illustrates a system for monitoring the rate of etching of a substrate in accordance with the present invention.

FIG. 3 illustrates an etching system 1 for etching trenches 19 in a semiconductor wafer 17 in accordance with the present invention. Semiconductor wafer 17 may be a silicon (Si) wafer, a germanium (Ge) wafer or a wafer of some other semiconductor material, for example, the compound semiconductors including, but not limited to, gallium arsenide (GaAs), gallium nitride (GaN), indium phosphide (InP) and gallium indium phosphide (GaInP). In the alternative, a substrate of another suitable material may be used. Etching system 1 includes etching chamber 13, light source 5, transmission optics 7, focusing/collecting optics 11, transmission optics 9 and photodetector 3. A window 15 is disposed within the upper surface of etching chamber 13 for transmitting incident light from source 5 to semiconductor wafer 17 and reflected light from semiconductor wafer 17 to photodetector 3.

Light source 5 may be a diode laser, a tungsten/halogen lamp, a helium/neon light or any other appropriate light source. Light from light source 5 is transmitted through transmission optics 7 to focusing/collecting optics 11. Focusing/collecting optics 11 collimates the light for transmission onto semiconductor wafer 17. In the alternative, focusing/collecting optics 11 may transmit a converging or diverging beam of light onto semiconductor wafer 17.

The incident light passes from focusing/collecting optics 11, through window 15 onto upper surface 18 and trenches 19 of semiconductor wafer 17. A portion of this incident light is reflected from this upper surface and the trenches back through window 15 to focusing/collecting optics 11. Focusing/collecting optics 9 collects this reflected light and transmits the collected light through transmission optics 9 to photodetector 3. Focusing/collecting optics 9 may include, e.g., a large diameter, short focal length lens, such as a Fresnel lens or a positive lens. Photodetector 3 employs an appropriate logic circuit to monitor the collected light for the repetitive maximum and minimum intensities resulting from interference between light reflected from upper surface 18 and trenches 19. Using the formula discussed above, photodetector 3 determines the depth d to which trenches 19 are etched based upon the wavelength of the incident light and the time period between the maximum and minimum intensities of the reflected light.

Figure 4:
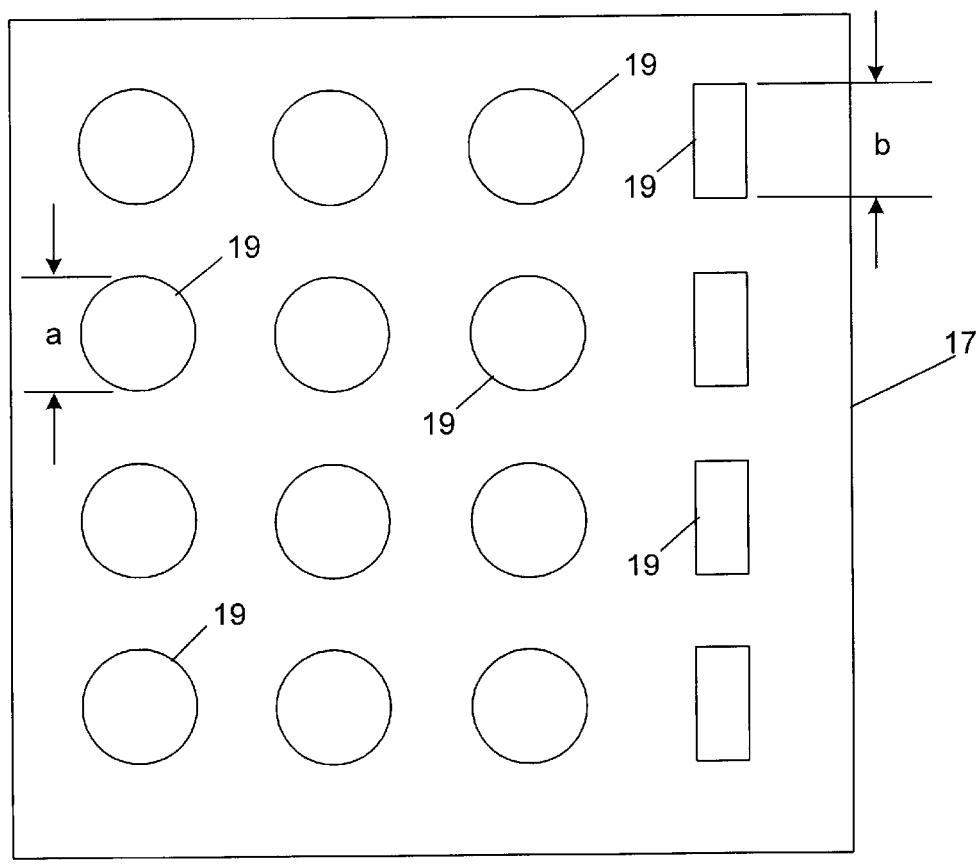
FIG. 4 illustrates a typical array of trenches on a substrate whose rate of etching is monitored in accordance with the present invention.

As is well known in the art, the trenches within semiconductor wafer 17 may be etched in conjunction with fabricating the wafer into any one of a number of semiconductor devices or circuits, for example, a dynamic random access memory (DRAM), an application specific integrated circuit (ASIC), a programmable read-only memory (PROM), an electronically erasable programmable read-only memory (EEPROM), an arithmetic logic unit (ALU), etc. In the process of fabricating such devices, a semiconductor wafer undergoes several layering, doping and etching operations. As illustrated in FIG. 4, the geometry of trenches 19 etched within semiconductor wafer 17 may comprise circular holes having a diameter a, rectangular trenches having a width b and other shapes.

As discussed above, because manufacturers are fabricating more and more transistors, diodes, etc. on a single semiconductor wafer, the dimensions of the etched trenches, for example, the diameter a (FIG. 4) of the circular holes or the width b of the rectangular trenches, are now in many cases less than 100 nm. Some manufacturing techniques require the application of a collar at the mouth of each trench which further narrows the trench's opening to between 60 nm and 70 nm.

In accordance with the present invention, the wavelength of the incident light from source 5 is not selected to cause trenches 19 to act as waveguides for transmitting this light to the bases of the trenches. The wavelength of the incident light is selected instead to be above the wavelength at which the trenches act as waveguides, i.e., above the cutoff wavelength of the trenches. For trenches 19 which are circular holes and rectangular trenches, therefore, the wavelength of the incident light is above, respectively, 1.71 times (dimension a) and 2.00 times (dimension b) (FIG. 4).

In simulation studies, the strength of the interferometric signal for semiconductor wafers having trenches with a critical dimension of 100 nm or less was found to be unexpectedly stronger for incident light at wavelengths substantially above the trenches' cutoff wavelength than at wavelengths below the trenches' cutoff wavelength. This effect also was observed for trenches having a critical dimension substantially above 100 nm, e.g., trenches having a critical dimension of approximately 200 nm. A strong interferometric signal was observed from semiconductor wafers having trenches with a critical dimension of 200 nm or less using light having a wavelength of 470 nm or greater.

Without limiting the invention to any particular scientific phenomenon, for trenches having a critical dimension of 200 nm or less, we believe this unexpected result is caused by the increased transparency of the semiconductor wafer to electromagnetic radiation at wavelengths above the trenches' cutoff wavelength. This increased transparency more than offsets the enhanced transmission of the radiation down the trenches at the wavelengths necessary for the trenches to act as waveguides. Notwithstanding that the trenches do not act as waveguides, therefore, substantially more light reaches the bases of the trenches at the longer wavelengths. Also, notwithstanding the longer wavelengths, the bases of the trenches remain substantially reflective to the incident light to result in strong constructive and destructive interference between the incident light and the reflected light. By practicing our invention, therefore, conventional interferometric equipment can be used to monitor the etching rate of trenches having extremely small critical dimensions.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of measuring the rate of etching of trenches on a substrate using interferometry comprising:
    transmitting onto the substrate incident electromagnetic radiation having a wavelength above the wavelength at which the trenches act as waveguides for the radiation;
    collecting reflected electromagnetic radiation from the substrate;
    detecting a repetitive pattern of maximum intensities and minimum intensities of the reflected electromagnetic radiation during the etching; and
    determining the rate of etching based upon the wavelength of the incident electromagnetic radiation and the time period of the pattern.

2. A method as in claim 1, wherein the trenches are circular and the wavelength of the incident electromagnetic radiation is greater than 1.71 times the diameter of the trenches.

3. A method as in claim 1, wherein the trenches are rectangular and the wavelength of the incident electromagnetic radiation is greater than 2.00 times the length of the long edge of the rectangle.

4. A method as in claim 1, wherein the critical dimension of the trenches is 70 nm or less.

5. A method as in claim 1, wherein the critical dimension of the trenches is 100 nm or less.

6. A method as in claim 1, wherein the critical dimension of the trenches is 200 nm or less.

7. A method as in claim 6, wherein the wavelength of the incident electromagnetic radiation is 470 nm or greater.

8. A method as in claim 1, wherein the substrate is a semiconductor wafer.

9. A method as in claim 8, wherein the semiconductor wafer is selected from the group consisting of silicon, germanium and the compound semiconductors.

10. A method as in claim 9, wherein the compound semiconductors are selected from the group consisting of gallium arsenide (GaAs), gallium nitride (GaN), indium phosphide (InP) and gallium indium phosphide (GaInP).

11. A method as in claim 1, wherein the substrate is housed within an etching chamber and the incident electromagnetic radiation and the reflected electromagnetic radiation are transmitted through a window in the etching chamber.

12. A method as in claim 1, wherein the incident electromagnetic radiation is transmitted from a source of radiation selected from the group consisting of a diode laser, a tungsten/halogen lamp and a helium/neon light.

13. A method as in claim 1, wherein the transmitting comprises transmitting the incident electromagnetic radiation through a focusing lens onto the substrate.

14. A method as in claim 1, wherein the collecting comprises collecting the reflected electromagnetic radiation from a collecting lens.

15. A method as in claim 1, wherein the detecting comprises detecting the repetitive pattern using a photodetector.

16. A method as in claim 1, wherein the rate of etching is proportional to $\lambda/2T$, where $\lambda$ is the wavelength of the incident light and T is the time period between consecutive maximum intensities of the reflected light or consecutive minimum intensities of the reflected light.

17. A method of determining the depth of trenches on a substrate using interferometry comprising:
    transmitting onto the substrate incident electromagnetic radiation having a wavelength greater than the cutoff wavelength for the trenches to act as waveguides for the radiation;
    collecting reflected electromagnetic radiation from the substrate;
    detecting a repetitive pattern of maximum intensities and minimum intensities of the reflected electromagnetic radiation; and
    determining the depth of the trenches based upon the wavelength of the incident electromagnetic radiation and the time period of the pattern.

18. A method as in claim 17, wherein the trenches are circular and the cutoff wavelength is approximately 1.71 times the diameter of the trenches.

19. A method as in claim 17, wherein the trenches are rectangular and the cutoff wavelength is approximately 2.00 times the length of the long edge of the rectangle.

20. A method as in claim 17, wherein the critical dimension of the trenches is 70 nm or less.

21. A method as in claim 17, wherein the critical dimension of the trenches is 100 nm or less.

22. A method as in claim 17, wherein the critical dimension of the trenches is 200 nm or less.

23. A method as in claim 22, wherein the wavelength of the incident electromagnetic radiation is 470 nm or greater.

24. A method as in claim 17, wherein the substrate is a semiconductor wafer.

25. A method as in claim 24, wherein the semiconductor is selected from the group consisting of silicon, germanium and the compound semiconductors.

26. A method as in claim 25, wherein the compound semiconductors are selected from the group consisting of gallium arsenide (GaAs), gallium nitride (GaN), indium phosphide (InP) and gallium indium phosphide (GaInP).

27. A method as in claim 17, wherein the substrate is housed within an etching chamber and the incident electromagnetic radiation and the reflected electromagnetic radiation are transmitted through a window in the etching chamber.

28. A method as in claim 17, wherein the incident electromagnetic radiation is transmitted from a source of radiation selected from the group consisting of a diode laser, a tungsten/halogen lamp and a helium/neon light.

29. A method as in claim 17, wherein the transmitting comprises transmitting the incident electromagnetic radiation through a focusing lens onto the substrate.

30. A method as in claim 17, wherein the collecting comprises collecting the reflected electromagnetic radiation from a collecting lens.

31. A method as in claim 17, wherein the detecting comprises detecting the repetitive pattern using a photodetector.

32. A method as in claim 17, wherein the determining of the depth comprises determining the rate at which the depth is increasing based upon the formula $\lambda/2T$, where $\lambda$ is the wavelength of the incident light and T is the time period between consecutive maximum intensities of the reflected light or consecutive minimum intensities of the reflected light.

* * * * *